United States Patent [19]

Bierenbaum et al.

[11] 4,058,582

[45] Nov. 15, 1977

[54] SIMULTANEOUS STRETCHING OF MULTIPLE PLIES OF POLYMERIC FILM

[75] Inventors: Harvey S. Bierenbaum, Berkley Heights; John A. Penoyer, North Plainfield; Daniel Zimmerman, East Brunswick, all of N.J.

[73] Assignee: Celanese Corporation, New York, N.Y.

[21] Appl. No.: 365,366

[22] Filed: May 30, 1973

[51] Int. Cl.² .................... B29D 7/24; B29D 27/00
[52] U.S. Cl. .................... 264/154; 264/288; 264/289; 264/DIG. 47
[58] Field of Search ............ 264/288, 289, 95, 209, 264/173, 210 R, 154, 291, DIG. 47

[56] References Cited

U.S. PATENT DOCUMENTS

| 2,848,747 | 8/1958 | Dixon | 264/146 |
|---|---|---|---|
| 3,194,863 | 7/1965 | Williams, Jr. et al. | 264/209 |
| 3,223,761 | 12/1965 | Raley | 264/95 |
| 3,248,753 | 5/1966 | Kobayashi | 264/289 |
| 3,257,489 | 6/1966 | Heffelfinger | 264/289 |
| 3,322,870 | 5/1967 | Sacks | 264/95 |
| 3,415,920 | 12/1968 | Lee et al. | 264/171 |
| 3,426,754 | 2/1969 | Bierenbaum | 117/122 P |
| 3,558,764 | 1/1971 | Isaacson | 264/288 |
| 3,565,985 | 2/1971 | Schrenk et al. | 264/173 |
| 3,679,538 | 7/1972 | Druin et al. | 161/159 |
| 3,758,370 | 9/1973 | Sakurai et al. | 264/209 |

Primary Examiner—James B. Lowe
Attorney, Agent, or Firm—Marvin Bressler; Thomas J. Morgan; Linn I. Grim

[57] ABSTRACT

An improved process for the manufacture of stretched polymeric films. In this process more than two plies of polymeric film are simultaneously stretched. The process of this invention is particularly applicable to those films which must remain free of surface irregularities. For example, the properties of microporous polymeric films are significantly improved by the process of this invention.

2 Claims, No Drawings

SIMULTANEOUS STRETCHING OF MULTIPLE PLIES OF POLYMERIC FILM

BACKGROUND OF THE INVENTION

1. Field of the Invention

The instant invention is directed to a process for the preparation of stretched polymeric film. More particularly, the instant invention is directed to a process for preparing stretched polymeric films in which more than two piles of the film are stretched simultaneously.

2. Background of the Prior Art

An important processing step in the preparation of many polymeric film products is one or more stretching steps. Stretching, which may be uniaxial or biaxial, is employed to impart one or more characteristics or properties to the film. For instance, stretching may be employed to orient the film to provide improved tensile characteristics. Other films are stretched to change them from a non-open-celled film to an open-celled microporous film. Still other films are stretched for purposes that are specific to their application. Suffice it to say, a significant percentage of commercial film production includes the processing step of stretching formed film in one or more steps, and in one or more directions.

Polymeric film stretching requires that the film be in contact with machinery which stretches the film. For instance, a typical means for stretching film is by contacting the film between a first pair of rollers and thereafter by a second pair of rollers, disposed downstream of the first pair of rollers. The second pair of rollers is rotated at a speed in excess of the first pair of rollers. The excess speed imparted to the film by the second pair of downstream rollers results in stretching of the film between the two sets of rollers. In the course of such a procedure the surface of the film may suffer surface damage of imperfections due to the contact of the heavy rolls on the polymeric film.

Other means for stretching film also require contact between heavy machinery and film. Typically, film is stretched in the transverse direction by means of a tender. Tenters are machines which hold the film at its sides and extend outward to increase the width of the film. Specifically, the size of the film in contact with the tenter is usually slit and discarded.

The surface damage which may be imparted to stretched films have serious deleterious effects on certain important properties of polymeric film. One such effect is the optical properties of the film. Obviously, a film surface that is damaged, scratched or the like does not provide the type of surface necessary to provide the optical properties necessary in certain film applications. Metallized films, for one, require a perfectly clear surface. Packaging films which include printing on their surface also require good optical properties to provide a suitable substrate for the printed material.

Freedon from surface defects is a critical property in open-celled films such as porous and microporous films. Surface defects have an appreciable effect on the gas transmittability property of these films. The gas flux, a very important property in an open-celled film, is usually decreased when subjected to surface defects due to the closing of pores. In addition, the stability of open-celled films, as measured by variation in gas flux with time, is similarly adversely affected by surface defects.

Another important defect which arises during conventional film stretching operations resides in the exposure of the film to surface contamination. This is especially significant in such applications as microporous film which are often employed in medical applications, i.e., burn dressings and the like.

In conventional single or double ply stretching, at least one surface of each stretched ply is exposed to the atmospheric conditions in the area of the stretching apparatus. As those skilled in the art are aware, unless expensive precautions are observed, these conditions can result in surface contamination.

In addition to the deficiencies of the prior art represented by the inability of the processes of the prior art to produce a stretched film totally free of surface defects, film processing involving a stretching operation has an inherent production limitation limiting the rate of the formation of the stretched film. This limitation applies to all films, not only those whose surface properties are of critical importance. The prior art does not suggest any method by which the processing speed of stretched films may be improved.

For the above reasons a new process providing a new means for stretching film, which does not result in surface damage to the film, and which increases the production rate would represent a significant advance in the film forming art.

SUMMARY OF THE INVENTION

The process of the instant invention provides a new means for stretching film which significantly reduces the amount of surface damage imparted to the film. Moreover, the process of the instant invention compared to the processes of the prior art, decreases to a significant degree surface contamination that results during the film stretching. Furthermore, the process of the instant invention provides a novel method for significantly increasing production rates of stretched films, independent of the important of surface damage to the properties of the film produced.

In accordance with the instant invention an improved process is provided for producing stretched polymeric films. In the process of the instant invention more than two plies of a film web are stretched simultaneously to produce a stretched film having the improved stretch properties resulting from fewer surface defects as compared to films formed in accordance with the processes of the prior art.

DETAILED DESCRIPTION

The process of the instant invention is applicable to all film processing which includes at least one stretching step. Although the invention requires a minimum of one stretching step, there is no limitation as to maximum number, direction or sequence of stretching steps. Moreover, the instant invention is independent of the purpose for which the stretching step is employed. Stretching to impart improved tensile properties, optical properties, porous properties or the like are all within the contemplation of this invention.

Not only are all stretching procedures within the contemplation of this invention, but moreover, the instant invention includes all polymeric films that are subject to stretching. For instance, polyester films such as polyethylene terephthalate film, polyolefinic films, such as polypropylene films, and polyamide films, such as nylon 6 films, represent films which include at least one stretching step in their formation and are within the contemplation of this invention. Of course, this grouping is not inclusive and other polymeric films which are subject to a stretching step are within the ambit of this invention.

The process of the instant invention applies to films that were previously formed and are thus unwound from a roll or the like prior to stretching. The process of this invention also applies to films being formed. That is, this process is applicable as the stretching step in a series of steps leading to the formation of a stretching film. Indeed, it is possible for some of the film plies to enter the stretching operation from a roll while others may come to the stretching operation directly from a previous step in a film forming process, i.e., directly from the casting roll or the like.

The instant invention, furthermore, applies to single ply film webs as, for example, flat films extruded through a slot extruder, as well as tubular, two ply films formed by extrusion through a circular slot, thereafter blown up and finally collapsed to form the tubular film. It should be noted that tubular films, although when collapsed, resemble flat films are considered two ply films. This is reasonable in that upon slitting of the edges two plies of the same gauge, same width film result.

It should be appreciated that the process of the instant invention is independent of the means by which the film is stretched. Typically longitudinal stretching occurs as the result of the passing of a film web over two adjacent rollers, the downstream roller rotating at a rotational speed in excess of the upstream roll. Similarly, transverse stretching, that is, stretching in a direction perpendicular to the longitudinal direction of the film is typically accomplished by the use of a device called a tenter. A tenter holds the edges of the film and moves outward, stretching the film to provide a wider width film. However, other methods may be employed for stretching films. These methods are within the contemplation of the process of the instant invention.

Films formed in accordance with the process of the instant invention possess unexpectedly improved properties over those same films formed in accordance with the stretching procedures of the prior art. The improved properties are postulated to be attributable to the decreased surface damage that results from the process of this invention. Specifically, the inner plies do not directly contact the moving parts that cause the film to stretch.

An excellent example of a property that is markedly improved by employment of the process of the instant invention is optical properties. Because of the decreased surface damage, as well as decreased surface contamination resulting from the process of the instant invention, the optical properties of a film are enhanced. Optical properties are important in packaging film where it is desired to clearly show the covered article. Furthermore, packaging film often includes printed matter which requires a damage-free surface in order to yield a readable and attractive print-out. Also, metallized film requires damage-free surfaces in order to provide a suitable substrate for the metallized coating. Films that are printed also require damage-free surfaces.

A particularly excellent example of a film whose properties are greatly enhanced by the practice of the instant invention are microporous films. Microporous films are open-celled films characterized by having decreased bulk density compared to the bulk density of the same film not having the open-celled structure. U.S. Pat. Nos. 3,426,754; 3,558,764; 3,679,538 and co-pending patent application Ser. No. 365,365 filed on May 30, 1973, now U.S. Pat. No. 3,843,761, describe microporous films and methods for making these films. These patents, incorporated by reference, indicate that certain microporous films are formed by stretching a non-open-celled film. In this process the non-open-celled film is initially cold-stretched at a temperature in the range of between about 25° C. and 120 ° C. followed by hot-stretching at a temperature in the range of between about 20° C. below the crystalline melting temperature of the polymer employed as the film to a temperature approximately 5° C. below the crystalline melting point of the polymer. Thus, the stretching step is critical in the formation of microporous films made in accordance with these patents. It has been found that microporous films formed from elastic, non-open-celled film have significantly improved properties when stretched in accordance with this invention. Specifically, the gas flux property, a critical property of microporous film, and stability, another very important property of microporous films, are greatly improved when processed in accordance with this invention.

The following examples are given to illustrate the instant invention. Because they are meant for illustrative purposes only, they should not, in any way, limit the scope of this invention .

EXAMPLE I

An elastic, non-open-celled, precursor polypropylene film was prepared in accordance with the blown film method described in U.S. Pat. No. 3,679,538. The prepared precursor film was wound onto a plurality of wind-up rolls. Because the film was prepared in accordance with the blown film method, the precursor film was a flattened tubular film. That is, the film comprised a two-ply layer in which the two plies were connected together.

EXAMPLE II

The elastic, non-open-celled film from one of the wind-up rolls, formed in accordance with Example I, was stretched in accordance with the procedure enumerated in co-pending U.S. Pat. application Ser. No. 365,365 filed on May 30, 1973, now U.S. Pat. No. 3,843,761, in which the film is stretched first in a cold-stretching step followed by a multiplicity of sequential hot-stretching steps. In this operation the film was initially cold-stretched at room temperature between two adjacent rollers, the downstream roller of which rotated at a speed in excess of the upstream roller. The cold-stretched film was subsequently hot-stretched at a temperature of 137° C. in a plurality of sequential stretching steps in which the film was passed over a plurality of driven rolls in which each subsequent downstream roll imparted a linear velocity to the film in excess of the velocity imparted by the adjacent upstream roll. This stretching operation resulted in the formation of a microporous film having a total length 110% of the length of the precursor film from which it was formed. (32% of this stretch was imparted by the cold-stretching step and 78% by the hot-stretching step.) The microporous film had a thickness of 1 mil.

The microporous film, formed in accordance with the above-described procedure, was slit at its edges to provide two film webs which were rewound in separate rolls.

Samples of each of the two webs, denoted as the top ply and the bottom ply, were tested to determine the gas flux property of the microporous film. More specifically, the films were tested to determine the amount of gas that flows through the pores of the microporous film at a fixed pressure. The test procedure employed was ASTM D 726, a standard procedure for determining resistance to gas flow of porous materials. In this test a 1-inch square sample of the microporous film is inserted into a Gurley densometer (described in ASTM D 726) and a pressure gradient equal to 12.2 inches of water is imposed. The time, in seconds, required to pass 10 cubic centimeters of air through the 1 inch square film sample is recorded as the measure of resistance to gas flow. The greater the number of seconds required to pass the set volume of air, the poorer is the gas flux of the microporous film.

Samples of the 1-inch square microporous film were tested at 5 points along the width of the film. Table I summarizes the results of this test. The air flux is reported in Table I in terms of Gurley seconds. The first number reported represents a sample taken at the left edge of the film and the subsequent numbers represent points to the right along the width of the film, so that the last number reported represents the air flux in Gurley seconds for a sample taken at the right edge of the film. Results are reported for the top web as well as the bottom web of the film.

TABLE I

| Ply | Gurley Value in Seconds | | | | |
|---|---|---|---|---|---|
| Top | 33 | 29 | 29 | 29 | 30 |
| Bottom | 41 | 39 | 34 | 32 | 33 |

It should be explained that a Gurley value of 30 seconds is considered a reasonably good flux film. Even a value as high as 40 is, in many applications, quite acceptable. However, certain applications require very high flux film. In these applications, a Gurley value of 30 is marginal at best. In these applications a Gurley second value below 25, and more preferably in the range of 20 to 25, is more preferred.

An example of an application which requires high gas flux is a microporous film battery vent cover. A battery vent is an opening in the battery casing which is covered with a porous article. The porous article must be chemically inert to the electrolyte enclosed inside the battery and have sufficiently small pores to prevent the flow of liquids through the pores. The most critical property of the porous articles, however, is ability to release gas which builds up during charging and discharging. In this application microporous film meets all the property requirements. However, the latter property requires a high flux characteristic in order to vent large quantitites of gas through its pores in a sufficiently short time to prevent pressure buildup. Thus, in this application a Gurley second value not in excess of 25 seconds is essential.

EXAMPLE III

Three rolls of the precursor, elastic polypropylene film formed in accordance with the procedure enumerated in Example I were unwound and stretched in accordance with the stretching procedure described in Example II. Thus, six plies of film (three webs, each comprising two attached plies) were stretched simultaneously. As in Example II, the cold-stretching step occured at room temperature while the multiple hot-stretching step was run at a temperature of 137° C. The precursor film was again stretched to 110% of its original length. Of this 110% total stretch, 32% was again the result of cold-stretching and 78% resulted from the multiple hot-stretch procedure. The final formed microporous film was once again 1 mil thick.

The three webs were slit at each edge to produce a six-ply roll. The rolls were separated into six individual rolls and each roll was marked to indicate its position during stretching. The uppermost ply was indicated as the bottom ply. The intermediate plies were numbered from the top ply, i.e., ply 2 represented the ply adjacent and below the top ply.

Samples of each ply were taken along the width of the film, as described in Example II. The samples were tested in the Gurley densometer according to the procedure described in Example II. The results of this test are given in Table II.

TABLE II

| Ply | Gurley Value in Seconds | | | | |
|---|---|---|---|---|---|
| Top | 37 | 33 | 34 | 36 | 42 |
| 2 | 22 | 22 | 24 | 23 | 23 |
| 3 | 20 | 20 | 20 | 20 | 19 |
| 4 | 22 | 21 | 23 | 22 | 21 |
| 5 | 22 | 21 | 23 | 22 | 20 |
| Bottom | 33 | 31 | 29 | 33 | 36 |

The results given in Table II provide a totally unexpected result. That is, the inner plies, in this case, plies 2-5, have significantly lower Gurley second values, that is, have significantly higher flux characteristics, than do the outer plies, the top and bottom plies. The inner plies have a Gurley second value in the range of between 19 and 24 whereas the outer plies have a Gurley second value in the range of between 29 and 42. On average, the inner plies have a Gurley value of approximately 20 while the outer plies have a Gurley value of approximately slightly above 30. Thus, the instant invention provides a means for manufacturing films having increased flux characteristics. It should be mentioned that the flux values of the top and bottom plies, although lower than the inner plies, are quite acceptable for many applications. Thus, there is no need to discard the top and bottom plies.

It should be noted that the flux values attained in the top and bottom plies are surprisingly similar to the results attained when a single web, comprising two plies, it processed individually in accordance with the procedures of the prior art as described in Example II. Thus, the theory enunciated above, that surface effects have a marked defect on microporous films, as well as other properties, is borne out by these experiments.

It should be emphasized that this procedure decreases processing cost in that must larger quantities of film may be processed on the same machinery and in the same time period compared to the stretching procedures of the prior art. In view of the fact that no film properties are adversely affected by this procedure, this process offers significant processing cost savings over the films of the prior art.

EXAMPLE IV

An experiment was conducted to determine the stability of films stretched in accordance with the instant invention. Film stability usually denotes the retention of film properties as a function of time. However, in order to test this property, accelerated tests are usually employed.

In the field of microporous films, a major consideration is the stability of the pore structure, that is, the retention of flux properties with time. In order to test for this property, the flux is tested upon formation of the film followed by a repeat test after exposure to elevated temperatures for a fixed period of time.

In accordance with the above testing, film samples were taken from the six rolls produced in accordance with Example III. These samples were tested in the Gurley densometer in accordance with test procedure described in Example II. The average flux, as measured in Gurley seconds, was determined and the film was then heated in an oven at 90° C. for 1 hour. The film samples were then retested in the Gurley densometer. The test again consisted of measuring five samples of each ply across the web of the film and taking the average flux value. The flux loss was determined as the decrease in flux between the original flux value and the flux value determined upon retesting divided by the orginal flux value. (All flux values in Gurley seconds.) The flux loss, in percent, for each ply is recorded in Table III.

TABLE III

| Ply | Flux Loss, % |
| --- | --- |
| Top | 16 |
| 2 | 9 |
| 3 | 9 |
| 4 | 10 |
| 5 | 10 |
| Bottom | 24 |

As can be determined from Table III, the greatest stability, as indicated by the flux loss, was attained by the inner microporous film plies. Although a microporous film product having a flux loss of up to 35% is considered stable, it should be emphasized that the flux loss of the inner plies of 9 to 10% represents a significantly more stable product than the film produced in the outside plies, which have an average flux loss of about 20%.

In view of the correlation in results attained for the top and bottom plies of a multi-ply stretching operation and the individual web-stretching of the prior art, the top and bottom plies represent the typical stability of micorporous films formed in accordance with processes of prior art. It is seen, then, that the process of the instant invention provides an approximately 50% more stable microporous film than the micorporous film formed in accordance with the processes of the prior art.

The importance of the stability of a film product cannot be overemphasized. Not only is film stability critical in microporous films, but is equally important in all films which require that the surface properties of the film, as originally formed, retain their original condition.

The above preferred embodiments and examples illustrate the scope of the instant invention. Other embodiments and examples, within the scope of the instant invention, are within the contemplation of this invention. Therefore, the scope of this invention should be limited only by the scope of the appended claims.

What is claimed is:

1. In a process for forming microporous film in which an elastic, non-open celled film is cold-stretched in the longitudinal direction, said cold-stretched film thereafter hot-stretched in the longitudinal direction to form said microporous film, the improvement which comprises cold-stretching more than two plies of said non-open celled film and hot-stretching more than two plies of said cold-stretched film simultaneously.

2. In a process for forming polymeric film in which film is stretched to produce a final stretched film, the improvement which comprises stretching more than two plies of said film simultaneously by holding the edges of said film plies and moving said edges outwardly whereby said film plies are stretched simultaneously in the transverse direction.

* * * * *